US010955939B2

(12) United States Patent
Gut et al.

(10) Patent No.: US 10,955,939 B2
(45) Date of Patent: Mar. 23, 2021

(54) METHOD FOR ESTIMATING THE ORIENTATION OF A PORTABLE DEVICE

(71) Applicant: Robert Bosch GmbH, Stuttgart (DE)

(72) Inventors: Juergen Gut, Tuebingen (DE); Markus Dihlmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/604,745

(22) PCT Filed: Mar. 15, 2018

(86) PCT No.: PCT/EP2018/056499
§ 371 (c)(1),
(2) Date: Oct. 11, 2019

(87) PCT Pub. No.: WO2018/210466
PCT Pub. Date: Nov. 22, 2018

(65) Prior Publication Data
US 2020/0103985 A1     Apr. 2, 2020

(30) Foreign Application Priority Data

May 18, 2017   (DE) .......................... 102017208365.4

(51) Int. Cl.
*G06F 3/0346*   (2013.01)
*G06F 3/01*     (2006.01)

(52) U.S. Cl.
CPC ............ *G06F 3/0346* (2013.01); *G06F 3/012* (2013.01)

(58) Field of Classification Search
CPC ....... G06F 3/0346; G06F 3/012; G01C 21/06; G01C 21/08; G01C 21/10; G01C 21/16
See application file for complete search history.

(56) References Cited

U.S. PATENT DOCUMENTS 9,240,069 B1    1/2016  Li
2011/0264393 A1* 10/2011 An ........................ G01P 15/008
                                                      702/104

(Continued)

OTHER PUBLICATIONS

Reus et al., "Correcting Drift, Head and Body Misalignments between Virtual and Real Humans", SBC Journal on 3D Interactive Systems, vol. 4, No. 2, 2013. (Year: 2013).*

(Continued)

*Primary Examiner* — Sardis F Azongha
(74) *Attorney, Agent, or Firm* — Norton Rose Fulbright US LLP; Gerard Messina

(57) ABSTRACT

A method for displaying pieces of visual information as a function of a spatial orientation of a portable device equipped with a first sensor for detecting orientation information and with an acceleration sensor, includes: estimating the spatial orientation based on the orientation information; ascertaining, based on sensor measurement data of the acceleration sensor, whether the device is in an idle phase or a movement phase; ascertaining an error of the estimation based on the orientation estimation ascertained in the idle phase and on the sensor measurement data of the acceleration sensor detected in the idle phase; using the orientation estimation unchanged in the idle phase for the display; successively correcting the error for the orientation estimation in a subsequent movement phase; and using the corrected estimation for the display in the movement phase.

9 Claims, 3 Drawing Sheets

(56) References Cited

U.S. PATENT DOCUMENTS

2017/0036111 A1* 2/2017 Shigeta ............... G01C 21/165
2018/0216959 A1* 8/2018 Dai ........................ G06F 3/011
2019/0064519 A1* 2/2019 Ben-Asher ............. G06F 3/012
2019/0346280 A1* 11/2019 Mutschler .......... G06K 9/00496

OTHER PUBLICATIONS

International Search Report dated May 18, 2018 of the corresponding International Application PCT/EP2018/056499 filed Mar. 15, 2018.
Changyu HE et al: "A novel drift compensating method for orientation measurement system in VR applications", 2013 IEEE International Instrumentation and Measurement Technology Conference (12MTC), IEEE, May 13, 2012, pp. 2482-2487, XPO32451624.

* cited by examiner

METHOD FOR ESTIMATING THE ORIENTATION OF A PORTABLE DEVICE

CROSS-REFERENCE TO RELATED APPLICATIONS

The present application is the national stage of International Pat. App. No. PCT/EP2018/056499 filed Mar. 15, 2018, and claims priority under 35 U.S.C. § 119 to DE 10 2017 208 365.4, filed in the Federal Republic of Germany on May 18, 2017, the content of each of which are incorporated herein by reference in their entireties.

FIELD OF THE INVENTION

The present invention relates to a method for displaying visual information as a function of a spatial orientation of a portable device, the device being equipped with at least one first sensor for detecting pieces of orientation information as well as an acceleration sensor, and to a portable device for carrying out such a method.

BACKGROUND

Portable devices for displaying pieces of visual information, in particular, when displaying a virtual reality or augmented reality, show the user images of a virtual display via an imaging device fastened to the head or supplement a real image recording with additional pieces of information, for example, regarding an observed object. During a head movement of the user, the image is shifted in the portable device in accordance with the head movement. For a correct adaptation, the orientation of the head must be determined at any given time. This normally takes place via a rotation rate sensor and a triple-axis acceleration sensor. However, the measurements of the rotation rate sensor are usually error-prone, so that the actual orientation and the calculated orientation can deviate. In order to be able to calculate a correction value, the data of the acceleration sensor are consulted. Usually, however, the acceleration sensor is unable to distinguish between the gravitational acceleration and an acceleration occurring during a movement of the portable device. Moreover, each sensor is subject to a permanent background noise, which further distorts the measured values. To correct this, sensor measurement data requires a complex filtering of the data as well as additional complex calculations and feedback of the corrected sensor measurement data to the display. Frequent corrections of the display can in the process result in high energy consumption. Continuous corrections can be felt as disruptive by the user, in particular, when the user remains in a fixed position.

SUMMARY

An object the present invention can be considered to be that of providing a method as well as a portable device, which make it possible to correct the estimation of the orientation of a device in space using sensors in an efficient, energy-saving and data-saving manner.

According to one aspect of the present invention, a method is provided for displaying pieces of visual information as a function of a spatial orientation of a portable device. The portable device is equipped with at least one sensor for detecting pieces of orientation information and an acceleration sensor. The spatial orientation of the portable device is estimated based on the detected pieces of orientation information and this orientation estimation is corrected using the sensor measurement data detected by the acceleration sensor. According to the present invention, it is ascertained based on the detected sensor measurement data whether the portable device is in an idle phase or in a movement phase and an error for the orientation estimation is ascertained based on the orientation estimation ascertained in an idle phase and of the measured data of the acceleration sensor detected in this idle phase. The respectively instantaneous orientation estimation is taken unchanged as a basis of idle phases of the display of the pieces of visual information. In the method, the error ascertained in an idle phase is taken into consideration and successively corrected according to the present invention in the orientation estimation in the following movement phase and a respectively instantaneous corrected orientation estimation is taken as a basis of movement phases of the display of the pieces of visual information.

The head of the user, and thus, the portable device situated on the head of the user, quietly remains in one position in the idle phase. During the idle phase, no corrections of the orientation estimation and thus of the display of pieces of visual information are carried out. While the head remains in one position, in particular, or during slow movements, corrections of the orientation estimation and of the displays of pieces of visual information on which they are based are more clearly perceived by the user than in rapidly executed movements. Sensor measurement data of the acceleration sensor are measured during the idle phase and a measured vector of the gravitational acceleration is ascertained. With the measured vector or the measured sensor measurement data of the acceleration sensor of the gravitational acceleration, it is then possible to ascertain an error of the orientation estimation. The error is calculated based on a deviation of the measured vector of the gravitational acceleration from the vector of the gravitational acceleration resulting from the orientation estimation.

In the movement phase on the other hand, the user moves his/her head and thus also the portable device. The portable device can, for example, be rotated upwardly or downwardly or toward one side. In the process, accelerations resulting from the movement are superposed on the measurement of the gravitational acceleration. In the movement phase, the acceleration sensor can be deactivated or the measurements of the acceleration sensor can be clocked slower. Instead, the orientation estimation and a display of pieces of visual information based thereon such as, for example, images, can be corrected in the movement phase by the ascertained and stored correction value. The orientation estimation in this case can be preferably slowly corrected. Slowly in this sense is to be understood in the sense that the adaptation of the display of visual pieces of information based on the orientation estimation is carried out in small steps without sudden change to the display, so that the user is unable to perceive the correction in the movement.

With the method, the advantages of each phase are exploited. In the idle phase, it is possible to measure exactly the gravitational acceleration without disruptions by linear acceleration of the portable device, triggered by the head movement of the user, so that the accuracy of the measurement of the vector of the gravitational acceleration can be increased. In this way, the accuracy of the correction value can also be increased. If the head of the user lingers in one position, the image must also not move since, with the head in an idle position, the human eye is able to register even a slight turning away or shaking of the image.

During the movement phase, the user is less able to perceive adaptations or a displacement of the display. Nevertheless, the orientation can be swiftly adapted in such a way that longer delays of the display or a "trailing" of the image are prevented. Delays of the display can trigger feelings of dizziness in the user. In contrast to known methods, the sensor measurement data of the acceleration sensor need not be continuously ascertained, but merely measured and evaluated in the idle phase. With the division of the correction of the orientation estimation into an idle phase and a movement phase, the portable device is able as a result of the method to operate in a computationally efficient and energy-saving manner.

According to an example embodiment of the method, a camera, a rotation rate sensor, a microphone, and/or a magnetic sensor are used to detect pieces of orientation information. In this way, it is possible to ascertain pieces of orientation information via a plurality of possible sensors. Visual sensors, in particular, such as for example, cameras, can also detect sensor measurement data, for example by analyzing multiple images, and, can supply pieces of information about movements of the portable device and about an alignment of the portable device in a space.

According to another example embodiment of the method, idle phases and movement phases are determined based on the sensor measurement data of the at least one first sensor for detecting pieces of orientation information and/or of the at least one acceleration sensor. A standardized signal of a rotation rate sensor can be used, for example, in order to effectuate a switch between the idle phase and the movement phase. If, for example, a sensor measurement value is higher than a particular threshold value, it can be assumed that the portable device is in motion, otherwise an idle phase can be assumed. Alternatively or in addition, signals of the acceleration sensor can be used for detection. If, for example, a difference of an instantaneous acceleration value and of an average acceleration value of the, for example, last 100 milliseconds, is greater than a defined threshold value, it can be assumed that the portable device is in motion, otherwise an idle phase of the portable device can be assumed. A combination of the two aforementioned conditions and sensors can also be used. Alternatively or in addition, the orientation can, however, also be determined using a camera system.

According to an example embodiment of the method, at least one correction value is determined based on the error ascertained in an idle phase for successive compensation of this error in the subsequent movement phase. During a movement phase or a movement of the head, the correction of the orientation estimation can be successively carried out in the form of a correction value. The correction value can influence the orientation estimation in each time step. The correction value can, for example, be defined in the form of rotation angles by which the estimated orientation must be rotated to be corrected. The aim in selecting the correction value is to carry out a soft correction of the present estimation error of the orientation estimation in order to prevent the user from being able to perceive the correction. The correction value can, for example, be a fraction or a factor of an actual estimation error. The orientation estimation and, therefore, the display can be corrected over multiple time steps or updating steps of the display using the correction value, until the actual estimation error has been completely corrected. If the estimation error has been completely corrected during a movement phase, the correction value can be set to zero, so that no further corrections are made until a next idle phase.

According to an example embodiment of the method, the instantaneous correction value is adapted each time to a movement of the portable device. So that the user preferably does not notice the correction of the orientation estimation, the correction can take place via a correction value as a function of the movement. The required correction or the correction value can be superposed by the movement of the portable device or of the head of the user. For this purpose, the error correction is not directly fully carried out once the portable device is in motion, but is selected as a function of the strength of the movement of the device and is carried out in multiple steps. The correction value can, for example, be defined proportionally to the sensor measurement data of the acceleration sensor minus the gravitational acceleration.

According to an example embodiment of the method, a rotational speed of the portable device is taken into account during the adaptation of the correction value. In this way, the correction value can be a linear or quadratically proportional function of sensor measurement data of the rotation rate sensor and, based on a rotation movement of the head of the user, a successive corrected orientation estimation of the display of the pieces of visual information can be provided as a basis.

According to an example embodiment of the method, the acceleration sensor is operated in movement phases at a lower sampling rate than in idle phases. The acceleration sensor in this case can alternatively be connected in the movement phases. With this measure, in particular, it is possible to lower an energy consumption of the portable device, since the acceleration sensor need not continuously ascertain sensor measurement data and, thus, need not be continuously supplied with electrical power.

According to an example embodiment of the method, the acceleration sensor is deactivated in movement phases. The reading out of the sensor measurement data and the calculation of the error of the estimated orientation need only take place when the portable device is in an idle phase. For this reason, it is possible with this method to carry out an energy-efficient correction of the orientation estimation. The acceleration sensor can preferably be fully switched off in the movement phases. This means that the acceleration sensor is able to ascertain data with a high degree of accuracy only in the idle phase. Thus, these collected data of the idle phase are not influenced by potential data collected in the movement phase, which can be distorted by the linear acceleration. In addition, the volume of data can be significantly reduced by switching off the acceleration sensor in the movement phase.

According to an aspect of the present invention, a portable device is provided for displaying pieces of visual information as a function of its spatial orientation according to the described method. The portable device includes at least one first sensor for detecting pieces of orientation information and an acceleration sensor.

The portable device can preferably be situated on or fastened to a head of a user. An idle phase or a movement phase of the portable device can be ascertained as a function of movements of the head. If, for example, the head of the user is moved little or is not moved, then an idle phase can be ascertained based on the sensor measurement data of the at least one sensor and/or of the acceleration sensor. During the idle phase, an error of the acceleration sensor is determined based on the sensor measurement data by a comparison with the actual gravitational acceleration. This error can be stored in a memory during the idle phase. If, for example, a movement phase of the portable device is detected, a corrected orientation estimation can be calculated based on the stored error, which can be taken as the basis for a corrected display of pieces of visual information. The acceleration sensor can, for example, be deactivated during the movement phase or can ascertain fewer sensor measurement data. In this way, the portable device can be designed in a more energy-saving manner. In addition, fewer sensor measurement data occur, which must be evaluated, as a result of which it is possible to reduce the computing power of the portable device.

Preferred example embodiments of the present invention are explained in greater detail below with reference to highly simplified schematic representations.

DETAILED DESCRIPTION

Figure 1:
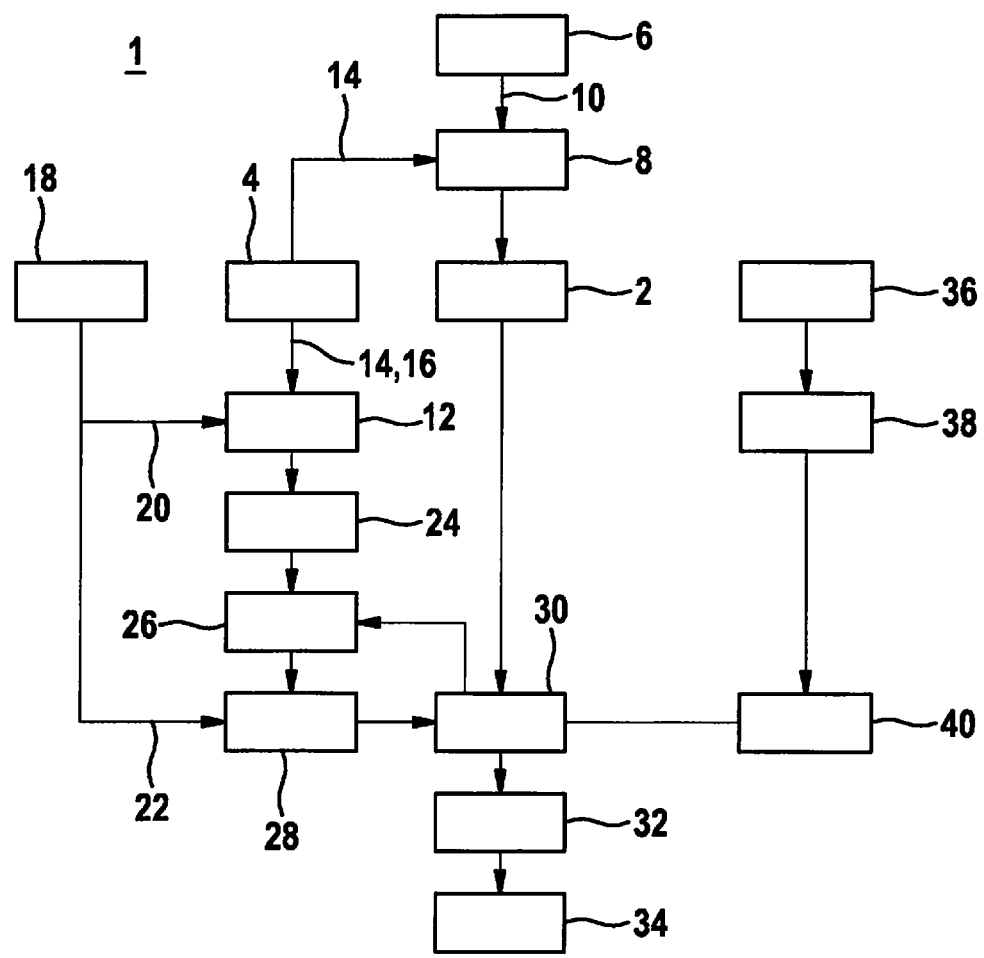
FIG. 1 is a flowchart that illustrates a method according to an example embodiment of the present invention.

FIG. 1 illustrates a method 1 in which an orientation estimation 2 takes place for adapting images to a head movement of a user. The head movement of the user is calculated using different movement sensor data. According to the example embodiment, a triple-axis rotation rate sensor 6 is utilized for generating sensor measurement data 8 for orientation estimation 2. Rotation rate sensor 6 serves as a main source of information for orientation estimation 2 of a portable device G shown in FIG. 3 for carrying out method 1. If an initial position of portable device G is known, orientation 2 of portable device G can be calculated by numerically integrating measured rotation rates 10, which are a component of sensor measurement data 8. This takes place in small time intervals in order to keep a latency of estimated orientation 2 preferably low. Sensor measurement data 10 of rotation rate sensor 6 are error-prone as a result of an offset, so that during longer use of portable device G, actual and calculated orientation 2 of portable device G can differ. This offset can be a reason for an error value 12. To be able to calculate error value 12, sensor measurement data 14 of triple-axis acceleration sensor 4 are used for calculating error value 12. Error value 12 is thus a result of a deviation of measured gravitational acceleration 16 from the estimated vector of gravitational acceleration g extracted from calculated orientation 2. Sensor measurement data 14 of acceleration sensor 4 are distorted, however, by linear accelerations of the head movements of the user. In addition, corrections in the image display of portable device G are registered by the user in an idle phase 20 and can trigger, among other things, feelings of dizziness in the user. Thus, a motion detection 18 is initially carried out before a measurement 16 of the gravitational acceleration by acceleration sensor 4. Motion detection 18 can alternatively also take place via rotation rate sensor 6 or via another sensor. Motion detection 18 can distinguish between an idle phase 20 and a movement phase 22 of the head movement of the user. Based on measured data 10 of rotation rate sensor 6 and on measured data 14 of acceleration sensor 4, motion detection 18 ascertains whether portable device G is in an idle phase 20 or in a movement phase 22.

If an idle phase 20 is detected by motion detection 18, a measurement of gravitational acceleration 16 is initiated by acceleration sensor 4 and error value 12 for estimated gravitational acceleration g is ascertained. Based on error value 12, a correction value 24 for an adaptation of an image conveyed with portable device G is subsequently stored in error memory 26.

If a movement phase 22 is detected by motion detection 18, then a correction factor 28 is ascertained from error memory 26 based on correction value 24. According to the example embodiment, correction factor 28 is established as a function of a strength of the movement of portable device G. Correction factor 28 is subsequently multiplied by correction value 24 and result 30 is applied to orientation estimation 2 of portable device G, so that a corrected orientation estimation 32 can be calculated and thus an adaptation 34 of images or of the display of pieces of visual information 33 to the head movement of the user can be made in the form of a corrected alignment of the images. Once correction 30 is completed, correction value 24 stored in error memory 26 is reduced by correction factor 28 applied for correction 30. Correction 30 by correction factor 28 can be repeated until correction value 24 in error memory 26 equals zero. With slow correction 30 of orientation estimation 2 and successive adaptation 34 of the images of portable device G, it is possible to implement a soft correction, which is not registered by the user during movement phase 22.

Errors or deviations in the orientation estimation of movements of the head of the user orthogonally to a direction of gravitational acceleration g, to the so-called "heading" H, cannot be corrected by acceleration sensor 4. For this purpose, method 1 utilizes a triple-axis magnetic sensor 36. Magnetic sensor 36 detects magnetic north pole N of the earth depicted in FIG. 3 and is able to determine a rotation deviation 38 or an error 38 of device G by "heading" H. In turn, a correction factor 40 can be calculated with this determined error 38 for the "heading" H. Correction factor 40 can now also be used for correction 30 of orientation estimation 2. The division into idle phase 20 and movement phase 22 and the use of error memory 26 is optional for the movements of portable device G orthogonally to the direction of gravitational acceleration g when using magnetic sensor 36, since the measurements of magnetic sensor 36 are only slightly influenced by the movements and accelerations of portable device G. However, the correction should only be carried out in the movement phase in order to prevent the user from perceiving the corrections.

Figure 2:
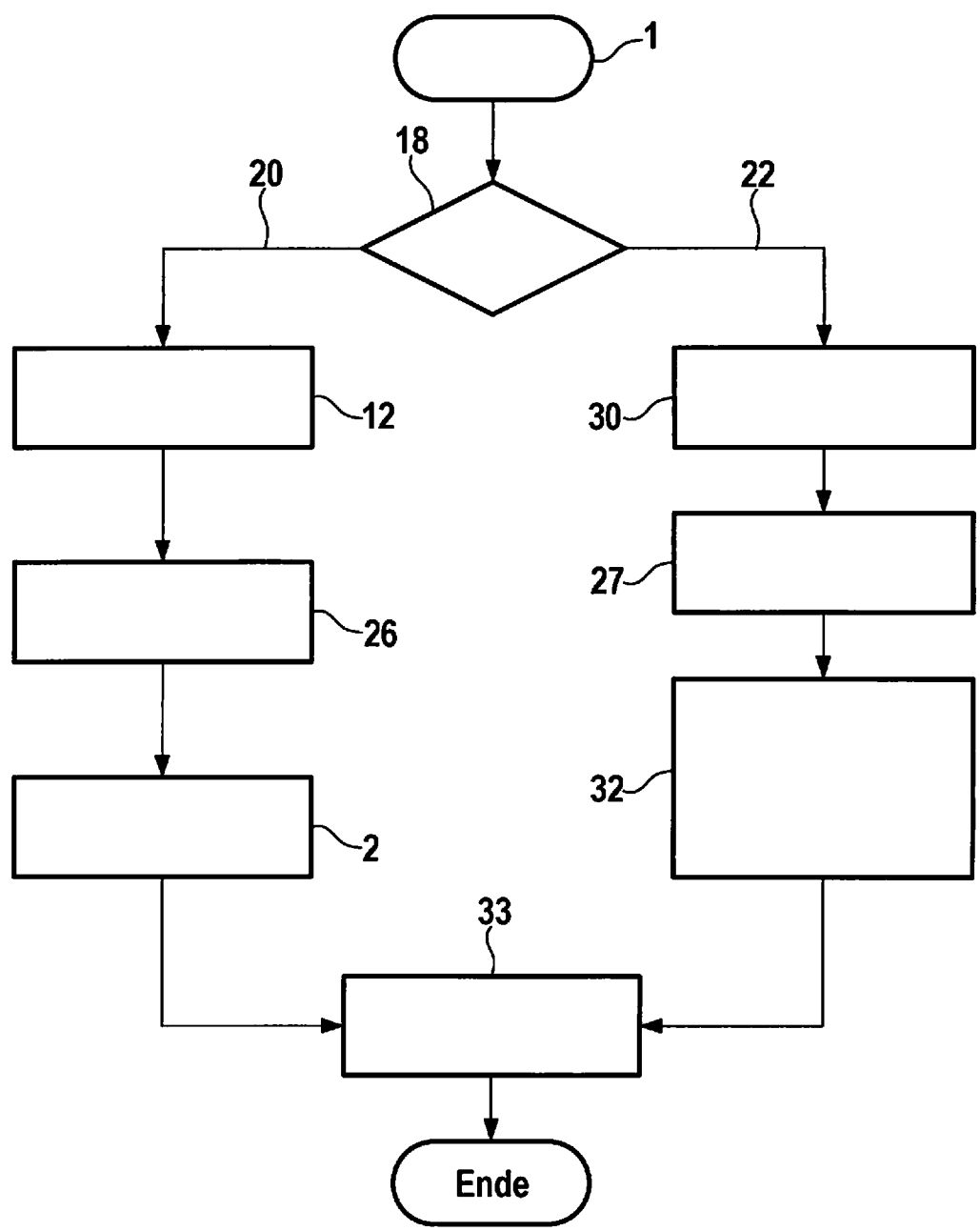
FIG. 2 is a flowchart that illustrates a method according to another example embodiment of the present invention.

FIG. 2 illustrates method 1 according to another example embodiment. Method 1 can be carried out iteratively. In a first step, it is ascertained based on sensor measurement data 8, 10, 14 whether portable device G is placed in an idle phase 20 or in a movement phase 22. If it is possible to ascertain an idle phase 20 based on sensor measurement data 8, 10, 14, then an error 12 for orientation estimation 2 is ascertained based on orientation estimation 2 and on sensor measurement data 8, 10, 14 detected in this idle phase 20. Error value 12 is subsequently stored in error memory 26 for use in next movement phase 22. In principle, an idle phase 20 can be followed by a movement phase 22. During idle phase 20, orientation estimation 2 is not changed or corrected. Instead, a display of pieces of visual information 33 is output based on unchanged orientation estimation 2. If, on the other hand, a movement phase 22 is determined, a correction 30 of orientation estimation 2 then takes place based on error value 12 ascertained during idle phase 20. Correction 30 in this case takes place successively, so that orientation estimation 2 can be carried out preferably unnoticed by the user. Accordingly, correction value 24 stored in error memory 26 is adapted 27 in accordance with previously carried out correction 30 of orientation estimation 2. Correction value 24 stored in error memory 26 can, for example, be reduced by one factor or one value. A corrected orientation estimation 32 is ascertained based on correction 30 of carried out orientation estimation 2. During movement phase 22, corrected orientation estimation 32 is provided as a basis for the display of pieces of visual information.

The corrected orientation estimation can be alternatively or additionally used in a further time step as a basis for ascertaining orientation estimation 2 using first sensor 6 or, according to the example embodiment, rotation rate sensor 6. Corrected orientation estimation 32 can, for example, be used as an output value for a time integration with the rotational speed of rotation rate sensor 6.

Figure 3:
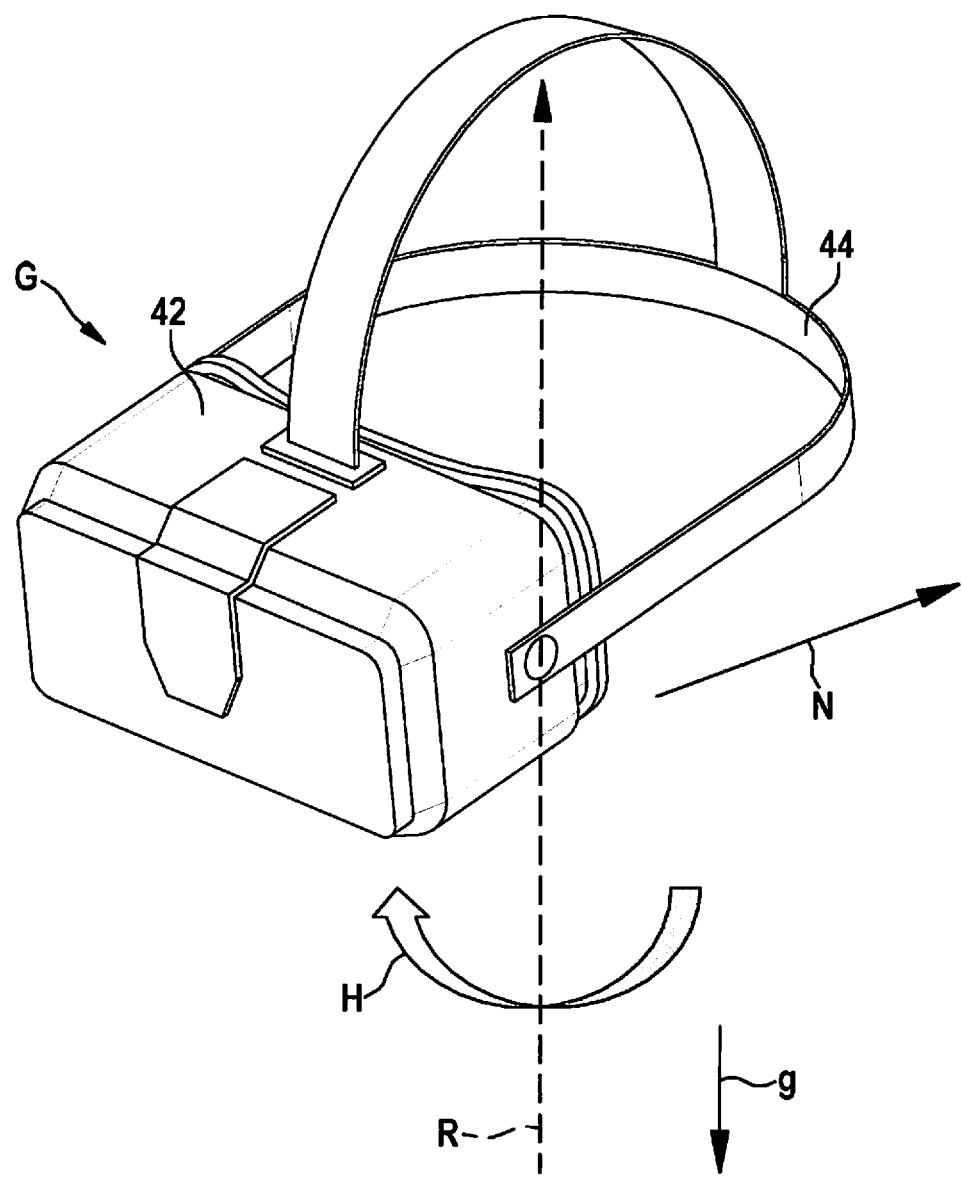
FIG. 3 schematically shows a representation of a portable device for carrying out a method, according to an example embodiment of the present invention.

FIG. 3 schematically shows a representation of portable device G for carrying out method 1 according to the first example embodiment. Portable device G according to the example embodiment includes a holder 42 fastenable to the head of the user. Holder 42 can be adapted and fastened to the head of the user via an elastic strap 44. Holder 42 includes an imaging device 48. Holder 42 includes an optical system not shown and is equipped with electronics and sensors. Holder 42 includes acceleration sensor 4, rotation axis sensor 6 and magnetic sensor 36. Movements of the head of the user orthogonally to a direction of gravitational acceleration g, or about rotation axis R of portable device G are the "heading" H. Magnetic sensor 36 is able to register magnetic north pole N and detect rotation deviations of portable device G from magnetic north pole N.

What is claimed is:

1. A method for displaying pieces of visual information as a function of a spatial orientation of a portable device situated on the head of a user that is equipped at least with a first sensor for detecting pieces of orientation information and with an acceleration sensor, the method comprising:
   over time, estimating the spatial orientation of the portable device based on the detected pieces of orientation information of the first sensor;
   based on the detected sensor measurement data of the acceleration sensor, determining that the portable device is in an idle phase;
   ascertaining an error for the orientation estimation based on the orientation estimation ascertained in the idle phase and on the sensor measurement data of the acceleration sensor detected in the idle phase;
   using the estimated spatial orientation estimated in the idle phase unchanged to display the pieces of visual information;
   subsequently, based on the detected sensor measurement data of the acceleration sensor, determining that the portable device is in a movement phase;
   correcting the estimated spatial orientation estimated during the movement phase based on the error ascertained in the idle phase; and
   using the corrected estimation to display the pieces of visual information in the movement phase.

2. The method of claim 1, wherein the first sensor includes a camera, a rotation rate sensor, a microphone, and/or a magnetic sensor.

3. The method of claim 1, wherein the idle and movement phases are determined additionally based on data of the first sensor.

4. The method of claim 1, further comprising determining a correction value based on the ascertained error.

5. The method of claim 4, wherein the correction value is adapted to movement of the device.

6. The method of claim 5, wherein a rotational speed of the device is taken into account when determining the correction value.

7. The method of claim 1, wherein the acceleration sensor is operated at a lower sampling rate in movement phases than in idle phases.

8. A method for displaying pieces of visual information as a function of a spatial orientation of a portable device that is equipped at least with a first sensor for detecting pieces of orientation information and with an acceleration sensor, the method comprising:
   over time, estimating the spatial orientation of the portable device based on the detected pieces of orientation information of the first sensor;
   based on the detected sensor measurement data of the acceleration sensor, determining that the portable device is in an idle phase;
   ascertaining an error for the orientation estimation based on the orientation estimation ascertained in the idle phase and on the sensor measurement data of the acceleration sensor detected in the idle phase;
   using the estimated spatial orientation estimated in the idle phase unchanged to display the pieces of visual information;
   subsequently, based on the detected sensor measurement data of the acceleration sensor, determining that the portable device is in a movement phase;
   correcting the estimated spatial orientation estimated during the movement phase based on the error ascertained in the idle phase; and
   using the corrected estimation to display the pieces of visual information in the movement phase,
   wherein the acceleration sensor is deactivated in movement phases.

9. A portable device situated on the head of a user comprising:
   a first sensor for detecting pieces of orientation information;
   an acceleration sensor; and
   a processor, wherein the processor is configured to perform a method, the method comprising:
      over time, estimating a spatial orientation of the portable device based on the detected pieces of orientation information of the first sensor;
      based on detected sensor measurement data of the acceleration sensor, determining that the portable device is in an idle phase;
      ascertaining an error for the orientation estimation based on the orientation estimation ascertained in the idle phase and on the sensor measurement data of the acceleration sensor detected in the idle phase;
      using the estimated spatial orientation estimated in the idle phase unchanged to display pieces of visual information;
      subsequently, based on the detected sensor measurement data of the acceleration sensor, determining that the portable device is in a movement phase;
      correcting the estimated spatial orientation estimated during the movement phase based on the error ascertained in the idle phase; and
      using the corrected estimation to display the pieces of visual information in the movement phase.

* * * * *